(12) United States Patent
Knaut et al.

(10) Patent No.: US 12,001,272 B2
(45) Date of Patent: Jun. 4, 2024

(54) METHOD FOR THE REMOTE-CONTROLLED HANDLING OF AN ERROR FINDING IN A MEANS OF TRANSPORT, MEANS OF TRANSPORT, BACKEND SERVER AND SYSTEM

(71) Applicant: Bayerische Motoren Werke Aktiengesellschaft, Munich (DE)

(72) Inventors: Axel Knaut, Munich (DE); Stefan Juraschek, Neubiberg (DE); Florian Mume, Munich (DE); Francois Bachellerie, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 452 days.

(21) Appl. No.: 17/415,753

(22) PCT Filed: Oct. 24, 2019

(86) PCT No.: PCT/DE2019/100921
§ 371 (c)(1),
(2) Date: Jun. 18, 2021

(87) PCT Pub. No.: WO2020/125844
PCT Pub. Date: Jun. 25, 2020

(65) Prior Publication Data
US 2022/0083411 A1    Mar. 17, 2022

(30) Foreign Application Priority Data

Dec. 18, 2018   (DE) .......................... 102018132685.8

(51) Int. Cl.
*G06F 11/07*  (2006.01)
*G06F 8/65*   (2018.01)
*G06F 8/71*   (2018.01)

(52) U.S. Cl.
CPC ............ *G06F 11/0766* (2013.01); *G06F 8/65* (2013.01); *G06F 8/71* (2013.01)

(58) Field of Classification Search
CPC .......... G06F 11/0766; G06F 8/65; G06F 8/71; G06Q 10/20
(Continued)

(56) References Cited

U.S. PATENT DOCUMENTS 8,676,432 B2   3/2014 Patnaik et al.
2006/0271255 A1   11/2006 Stott et al.
(Continued)

FOREIGN PATENT DOCUMENTS

DE   102005048337 A1    4/2007
DE   102008022771 A1 *  12/2008
(Continued)

*Primary Examiner* — Muhammad Shafi
(74) *Attorney, Agent, or Firm* — Yong Beom Hwang; 2SPL Patent Attorneys PartG mbB (57) ABSTRACT

The invention relates to a method for remotely handling a conspicuity pattern or error report of a means of transport (1a-1d) comprising the steps of: receiving the conspicuity pattern of error report (ER) from the means of transport (1a-1d) on a back-end server (3); automatically determining an error pattern (F1-F6) stored on the back-end server (3) as a function of the error report (ER), in response thereto automatically determining a configuration requirement as a function of the stored knowledge; automatically generating and sending a configuration request representing a union set of the respective configuration requirements to the means of transport (1a-1d); receiving (500) a configuration specification in response to the configuration request on the back-end server (3); and automatically determining an action, like e.g. a troubleshooting operation or an information based on the configuration specification by the back-end server (3).

11 Claims, 2 Drawing Sheets

(58) Field of Classification Search
USPC .......................................................... 701/29.1
See application file for complete search history.

(56) References Cited

U.S. PATENT DOCUMENTS

| | | |
|---|---|---|
| 2007/0010922 A1 | 1/2007 | Buckley |
| 2010/0174444 A1 | 7/2010 | Hansson et al. |
| 2011/0172874 A1* | 7/2011 | Patnaik ............... G06F 16/2474 |
| | | 707/E17.014 |
| 2017/0039785 A1 | 2/2017 | Richter et al. |
| 2019/0378355 A1* | 12/2019 | Bruneel, II ............. H04W 4/40 |

FOREIGN PATENT DOCUMENTS

| | | | |
|---|---|---|---|
| DE | 102008022771 A1 | | 12/2008 |
| FR | 2891379 | * | 3/2007 |
| GB | 2366407 A | | 3/2002 |

* cited by examiner

METHOD FOR THE REMOTE-CONTROLLED HANDLING OF AN ERROR FINDING IN A MEANS OF TRANSPORT, MEANS OF TRANSPORT, BACKEND SERVER AND SYSTEM

CROSS-REFERENCE TO RELATED APPLICATIONS

This application is a 35 U.S.C. § 371(c) national stage entry of PCT/DE2019/100921, filed on Oct. 24, 2019. That application claimed priority to German Application 10 2018 132 685.8 filed on Dec. 18, 2018. The contents of the earlier filed applications are incorporated by reference herein in their entirety.

FIELD

The present invention relates to a method for remotely handling an error report of a means of transport, a means of transport, a back-end server, and a system.

BACKGROUND

Today, vehicle service data from customers and/or user vehicles (for example, concerning repairs and/or breakdowns) as well as diagnostic data (vehicle operation and service data transfer and analysis and teleservice report readouts) may already be evaluated in a high-performance database analysis. Known customer problems may also be described in such a database by means of error patterns. These error patterns may be composed of logical combinations of different parameters, such as vehicle type, production period, software version, error memory entry, environmental conditions, measured values and warranty reports as well as customer comments. Such error patterns are represented by data in the database. The knowledge of customer problems is permanently extended by different methods. For example, verification of individual cases up to the application of automated data mining processes is conceivable. This allows errors of affected customer vehicles to be automatically linked to a knowledge database. This error pattern recognition may make it possible to derive quality measures which, for example, may have as their object an improvement of service measures up to the further development of software and hardware in the vehicle. However, the database concept described above has the disadvantage that an automatic linking of known problems of customer vehicles of a service institution, for example a dealer and/or a garage, is not available. As a result, a time-consuming manual analysis of already known problems has to be carried out by quality experts. There is still a lack of focus on new emerging customer issues.

DE 10 2008 022 771 A1 discloses a method and a system for transmitting vehicle diagnostic data to a vehicle service provider. This may be done, for example, via a user's smartphone. The diagnostic data sent may be stored, for example, on an Internet server via which the service provider has access to the diagnostic data. Here, however, the problem discussed above arises again that only individual vehicle diagnostic data may be processed by the service provider. In this way, the same error may be processed several times by independent service providers.

U.S. Pat. No. 8,676,432 B2 discloses an algorithm that may perform a prediction of a possibly occurring error based on collected vehicle error information. In response to the detected error, an alarm may be output. However, the problem here is that such an alarm does not provide any concrete information on how to solve the problem directly. Further, the alarm is one-way in nature, so it is not possible for a garage and/or other service provider to communicate directly with a database that creates the algorithm and collects vehicle error data.

Thus, it is an object of the present invention to alleviate the above-discussed disadvantages of the prior art and to make a handling of an error occurring on the vehicle side more efficient.

SUMMARY

The solution according to the invention is provided by the technical features of the independent claims.

In accordance with a first aspect, the present invention relates to a method of remotely handling an error report of a means of transport.

Suitable "means of transport" within the meaning of the invention are, for example, automobiles, in particular cars and/or trucks, and/or motorcycles and/or aircraft and/or ships.

In the present case, the term "remote handling" means in particular that the actual correction of a functional error of the means of transport does not take place exclusively on site, e.g. in a garage, but with the aid of a remote back-end server. Additionally or alternatively, the correction of the functional error may be carried out during a journey by means of the method according to the invention, which will be explained in more detail below.

In particular, an "error report" may be a finding of a functional error, such as incomplete charging of a battery and/or a software error and/or a malfunction of a component of the means of transport. Thus, an error report may include a vehicle diagnosis of an error and/or an externally detected error. The error report may be entered after external detection, e.g. via a selection menu and/or a drop-down menu via an input device of the means of transport. The error report may also be determined by sensor technology. For example, an error report may involve a damaged tire, a non-functional component of the means of transport, and/or a noticeable noise from the means of transport and/or a noticeable odor from the means of transport. In the case of a noticeable odor, for example, it may also be determined that fuel vapors are leaking from a location of the means of transport by arranging a gas detector at the side of the means of transport. An error report may in particular be determined electrically and/or optically, e.g. by means of a sensor system of the means of transport. For example, an abnormal coloration and/or opacity of the engine oil (as an error report) may be detected optically, e.g., by an arrangement of optical sensors in the oil pan of the means of transport.

In a first step of the inventive method, a receiving of the error report from the means of transport is performed on the back-end server. For example, the error report may be sent in the form of data from the means of transport to the back-end server. Such data may, for example, be sent wirelessly, such as over a mobile radio network, from the means of transport to the back-end server.

In a second step, an error pattern stored on the back-end server is automatically determined depending on the error report. For example, data representing the error report may be compared with data representing error patterns. Error patterns may, for example, be stored in a database of the back-end server. Error patterns may represent a single functional error of the means of transport, such as a loss of oil from the axle boot. Furthermore, error patterns may represent a chain of functional errors such as a broken toothed belt and a damaged cylinder head gasket. In other words, error patterns define problem causes and problem consequences, which correlate with parts of the means of transport. Error patterns may affect electronic and mechanical components of the means of transport. For example, data may be compared based on their content, such as strings. If there is a sufficiently large percentage agreement between the contents of the data of the error patterns and the error report, e.g. 80%, the relevant error patterns may first be determined by comparing them with the error report. An error pattern may further comprise features of an electrical error, e.g. a presence of a short circuit, and/or a mechanical error, e.g. a presence of a deformation of a part of the means of transport, and/or a presence of a visual conspicuity, e.g. of an abnormal color of the engine oil, and/or of a presence of an acoustic conspicuity, e.g. an abnormal howling of an engine, and/or of a presence of a temporal conspicuity, e.g. an age of a software component (e.g. more than 60 days without update).

Several configuration requirements may be assigned to stored error patterns. In order to be able to define and identify the error pattern and ultimately the troubleshooting operation more precisely, it may be necessary for configurations of the means of transport to be queried by the backend server of the means of transport as configuration requirements. Configuration requirements are information requests regarding technical components of the means of transport, which are needed to identify or exclude an error pattern. For example, configuration requirements associated with an error pattern may relate to configuration requirements relating to a position of the means of transport component and/or a serial number of a means of transport component. Furthermore, several error patterns may be determined automatically. Configuration requirements may include, for example, a transmission type, i.e., manual or automatic, and/or a body material and/or a paint grade of the means of transport, and/or information about whether the means of transport is left-hand drive or right-hand drive, and/or an engine type and/or a fuel grade of the means of transport. Further configuration requirements may concern, for example, information about a production date and/or a country-specific hardware and/or software variant of a means of transport component and/or a production parameter and/or a means of transport type and/or a usage profile and/or a presence of a trailer and/or a weight of an existing trailer. The usage profile may have information about the environment in which the means of transport was used. Examples of this information include a humidity and/or a degree of a road salting and/or a degree of an air pollution and/or a route profile (e.g. gradients).

In a third step, therefore, one or more configuration requirements are determined automatically as a function of the stored error pattern.

In a fourth step, a configuration request representing a union set of the respective configuration requirements is created and sent to the means of transport. The union set may be viewed as a combination of all the configuration requirements needed by the back-end server. The configuration request is therefore to be considered as a support request from the backend server, by which the means of transport is asked to list concrete information regarding the components. As explained above, multiple configuration requests may need to be sent to the means of transport, each configuration request being associated with a possible error pattern. In other words, the configuration request ensures that all information is available for troubleshooting.

In a next step, depending on the configuration request, a configuration specification may be created on the part of the means of transport. For example, all configuration data of the means of transport may be stored in a memory of the means of transport. Depending on the configuration request, this data may be filtered with regard to the configuration requirements. Filtering may be performed by means of data algorithms known to the skilled person. Here, the configuration data of the means of transport, which is stored, for example, on a means of transport memory, is determined by the data algorithm dependent on the configuration request. In response to this determination, configuration specifications are created. In a further step, a configuration specification is sent by the means of transport in response to the configuration request from the back-end server. The configuration specification may include a serial number of a means of transport component, as discussed above.

In a further step, the back-end server automatically determines a troubleshooting operation based on the configuration specification and the error pattern. The back-end server may in other words automatically suggest measures that are necessary to address the particular error pattern associated with a particular configuration and/or error pattern. For example, multiple troubleshooting operations may also be determined for an error pattern after the configuration specification is obtained on the back-end server. A troubleshooting operation may either correct the error itself (e.g. by means of a software update) or provide information that is necessary to correct the error (e.g. going to a garage). Thus, a troubleshooting operation may be understood as an aid or even a tool that is configured to fix an error for a specific means of transport problem depending on the configuration of the means of transport. For example, troubleshooting operations include control device tests, which may be performed remotely, i.e. via radio, or locally in a garage. In addition or alternatively, a determination of a troubleshooting operation may be made via a comparison of possible error patterns using the physically available error indicators (e.g. electronic measurement data and/or mechanical measurement data and/or measurement data concerning a gas composition and/or a color from onboard as well as offboard sources). In addition or alternatively, it is possible to determine the troubleshooting operation depending on information of a history, whereby the history concerns known error reports which have already occurred in connection with the concrete configuration specification. Further, a history may be defined for a relevant means of transport population, wherein the members of the means of transport population share at least one configuration-specific feature. Additionally or alternatively, a troubleshooting operation may be determined as a function of a ranking of the error patterns as a function of a predefined matching criterion. For example, a predefined matching criterion may correspond to a degree of matching between the error pattern and the error report. Additionally or alternatively, the predefined matching criterion may be defined based on a predefined priority table. Additionally or alternatively, the troubleshooting operation may be selected depending on a cost-optimized and/or time-optimized repair duration. Additionally or alternatively, the troubleshooting operation may be selected depending on a probability of detection of the error pattern. For example, a preventive exchange of a means of transport component may be provided if the error report associated with the means of transport component would not be determined again until after a predefined period of time (e.g., the next winter).

Thus, within the method according to the invention, an error report may be generated on the means of transport side. On the back-end server side, error patterns that are stored on the back-end server may be assigned to this error report. However, the back-end server needs further specific information from the means of transport in order to be able to assign a troubleshooting operation to the error pattern and/or to exclude error patterns. Configuration requirements are assigned to the error patterns for this purpose. Based on these configuration requirements, a configuration request is created, which is transmitted to the means of transport. This compiles a configuration specification depending on the configuration request and sends same to the back-end server. The back-end server may now, based on the configuration specification, exclude error patterns and/or derive one or more troubleshooting operations based on identified error patterns.

Due to the method according to the invention, customer satisfaction may be increased, since repair costs and the time required for a repair may be reduced. In this case, it takes only a few communication cycles to determine which troubleshooting operation is necessary for an error report or an error pattern of the means of transport. In this way, repair costs and warranty costs for the end customer may be avoided and/or saved. In addition, repair measures that would otherwise not have been necessary may be avoided. Thus, according to the invention, a method may be provided whereby error reports of the vehicle may be addressed more efficiently.

The subclaims relate to advantageous embodiments of the method according to the invention.

According to an advantageous further embodiment of the method according to the invention, the method comprises an act of sending the troubleshooting operation to the means of transport. This may be done via a mobile radio network, as described above. A troubleshooting operation may also include a message that the customer should visit a garage. However, the troubleshooting operation itself, after being sent to the means of transport, may fix an error. This may be done, for example, by performing a software update. This saves the user from having to visit the garage.

According to a further embodiment of the method according to the invention, the troubleshooting operation may comprise automatically initiating a software update and/or detecting a mock error. This may be helpful, for example, to avoid spending money and material resources to investigate errors that do not exist as such.

In a further advantageous embodiment of the method according to the invention, an error report is generated based on on-board diagnostic data and/or entries of an error memory of the means of transport. Additionally or alternatively, error reports may be determined based on data from a means of transport sensor system. Here, for example, it can be determined on the part of the means of transport sensor system that a tyre has burst. The driver may receive a troubleshooting operation quickly and efficiently. This may be, for example, the request to visit a garage. Additionally or alternatively, the troubleshooting operation may include a video and/or instruction. Content of this video and/or instruction may include, for example, a course of action regarding the error report and/or instructions for taking further steps. For example, the troubleshooting operation may also include a means of transport model-specific instruction as to which tools and/or spare parts are required. In other words, the means of transport may generate an error report through its own diagnostics and send data representing this error report to the back-end server.

In this way, a troubleshooting operation that would otherwise only be possible in a garage may be efficiently initiated and communicated without the need to (first) visit a garage.

According to an advantageous embodiment of the method according to the invention, the configuration specification facilitating the determination of a troubleshooting operation relates to a type of the means of transport component, e.g. a battery, and/or a position of the means of transport component, e.g. within the engine compartment, and/or an operating state of the means of transport component, e.g. activated and/or not activated, and/or a year of manufacture of the means of transport component and/or a serial number of the means of transport component. Such a configuration specification ensures that the error report may be assigned the smallest possible number of error patterns and thus the clearest possible troubleshooting operation. Thus, the configuration specification may be understood as a filter, ultimately saving computational power to identify a troubleshooting operation.

According to a further advantageous embodiment of the method according to the invention, the back-end server-side error pattern may relate to a malfunction of a part of the means of transport and/or a non-function of a part of a means of transport and/or a temperature anomaly of a part of a means of transport and/or a software error of a means of transport. In other words, any error reports concerning the on-board diagnostics and/or entries of the error memory and/or sensors of the vehicle may be associated with the error patterns on the back-end server. So, in other words, the error pattern is specified on a database of the back-end server. Configuration requirements are assigned to the error pattern, which may be requested by the backend server via a configuration request sent to the means of transport. The means of transport may create a configuration specification depending on this request and send it to the back-end server. Thus, the configuration requirements are answered and the error pattern may be identified. There are troubleshooting operations for the identified error pattern, which may be suggested by the back-end server after the error pattern has been identified.

According to a further advantageous embodiment of the method according to the invention, the method comprises the acts of displaying a selection of predefined error reports, e.g. "battery not fully charging", on a display unit, e.g. a head-up display and/or an instrument cluster and/or a central information display. Here, a user, for example an employee at a garage and/or a driver of a vehicle, may make a selection from predefined error reports. This may take the form of user input, e.g. haptic and/or acoustic and/or by means of a user gesture. In response to this, an error report is created depending on the predefined error report selected by the user. In this way, the user is provided with an intuitive and simple way to interact with the back-end server and/or with the vehicle to send an error report.

According to a further advantageous embodiment of the method according to the invention, a plurality of error patterns may have respective troubleshooting operations. For example, a software update may be provided as well as a detection of a mock error in the troubleshooting operation relating to the same error pattern, wherein the respective configuration requirements may involve a request relating to a serial number of a processor used in the vehicle and a memory used in the vehicle that is associated with the processor. Additionally or alternatively, a mock error may occur due to a misdiagnosis, wherein the misdiagnosis occurs due to an installation-related tolerance position of a means of transport component. For example, an incorrectly mounted door contact may cause the means of transport system to report that the door is open, when in reality the door is closed. For example, a software update could compensate for this faulty tolerance position by recalibrating the door contact threshold, thus minimizing the frequency of false diagnoses in the future.

In particular, the troubleshooting operations are selected from a plurality of troubleshooting operations based on the configuration specifications of the means of transport. Thus, time may be saved for troubleshooting operation determination. This also results in a saving of computing power of the back-end server.

The following aspects according to the invention accordingly comprise the advantageous implementations and further embodiments with the features as mentioned above, as well as the general advantages of the method according to the invention and the respective technical effects associated therewith. In order to avoid repetition, the list is therefore not repeated.

According to a second aspect, the present invention relates to a means of transport arranged to detect an error report. In response to this, the means of transport may send a message concerning the error report to a back-end server. Further, the means of transport is configured to receive a configuration request in response to the message of the error report. Moreover, the means of transport is configured to generate a configuration specification in response to the configuration request and to send the same to the back-end server in response to the configuration request. Finally, the means of transport may receive and perform a troubleshooting operation in response to the configuration specification. This may be done, for example, with the aid of an evaluation unit, e.g. a CPU and/or a microcontroller and/or an electronic control device.

According to a third aspect, the method according to the invention relates to a back-end server. The back-end server may (automatically) receive an error report from a means of transport. Furthermore, the back-end server may automatically search for error patterns that match this error report and, depending on this, determine a respective configuration requirement. A configuration request representing a union set of the respective configuration requirements may be automatically determined and sent to the means of transport. Further, a configuration specification may be received in response to the configuration request on the back-end server, and finally, a troubleshooting operation may be automatically determined based on the configuration specification.

According to a fourth aspect of the invention, the present invention relates to a system comprising a means of transport according to the second aspect of the invention and a back-end server according to the third aspect of the invention. For example, an electronic service interface, such as a PC, may be interposed between the back-end server and the means of transport to support the steps according to the method to be performed by the means of transport. For example, in the case of a particularly complicated repair within a service institution, a predefined error report may be entered by means of the PC. Such a predefined error report may then be sent to the back-end server. Moreover, an electronic service institution interface may also be a mobile unit. Thus, due to the method according to the invention, it is also easy for service institutions, e.g. garages, to obtain a cost-effective and efficient repair measure.

BRIEF DESCRIPTION OF THE FIGURES

Further details, features and advantages of the invention result from the following description and figures, in which.

DETAILED DESCRIPTION

Figure 1:
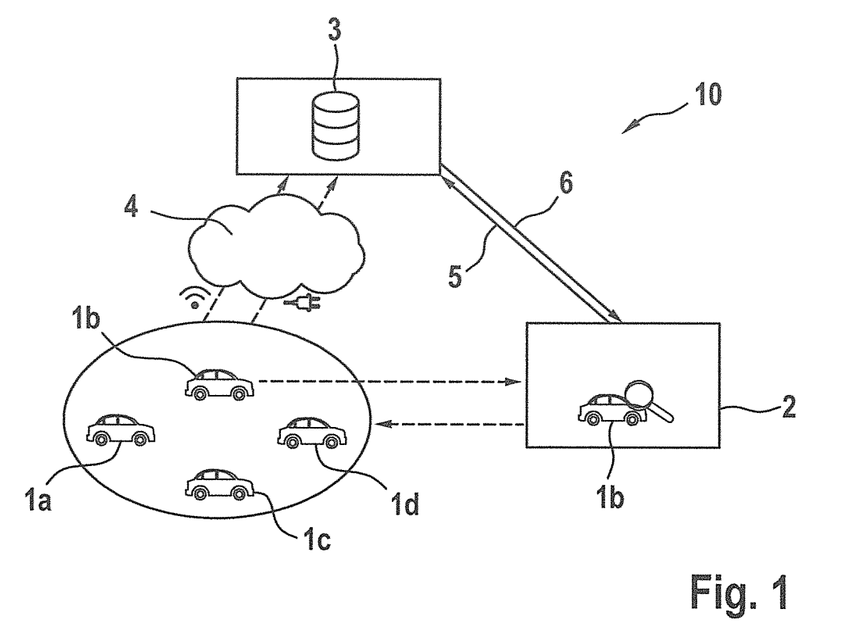
FIG. 1 shows a variant of the system according to the invention.

FIG. 1 shows a variant of the system 10 according to the invention comprising a service institution 2, a fleet of means of transport comprising first to fourth means of transport 1a-1d and a back-end server 3. The means of transport 1a-1d of the means of transport fleet are configured to send customer vehicle service data (concerning repairs and/or breakdowns) and diagnostic data to the back-end server 3, which may input this data. In particular, the back-end server 3 may thus collect error patterns F1-F6 from different means of transport 1a-1d. However, such data may also be transferred to the back-end server 3 by a research and/or development department. In the scenario shown in FIG. 1, the second means of transport 1b of the fleet of means of transport has to visit a garage. On the part of the garage, error reports ER are sent to the back-end server 3 via arrow B. The back-end server 3 may, as will be explained in more detail later, determine an error pattern F1-F6 depending on the error report ER. Further, the back-end server 3 may send data in response to the means of transport 1b, as illustrated by the arrow 6.

Figure 2:
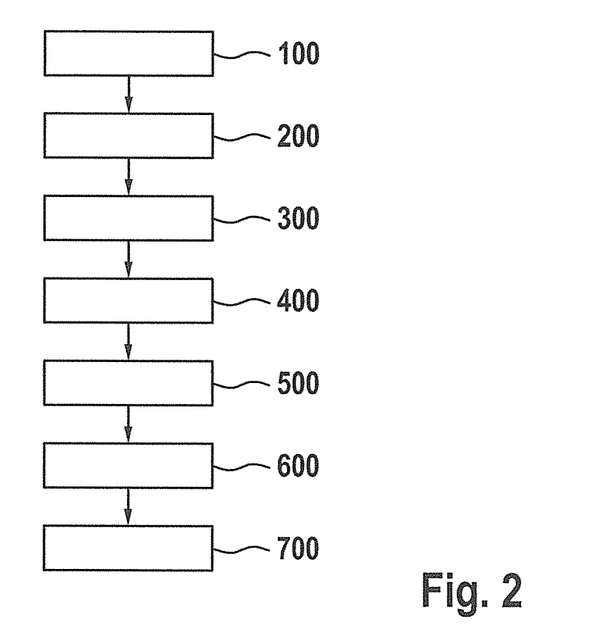
FIG. 2 shows a flow chart according to a variant of the method according to the invention.

FIG. 2 shows a flow chart according to a variant of the method according to the invention. In a first step 100, a receiving of an error report ER from the means of transport 1b is performed on the back-end server 3. Here, the error report ER relates to entries of the error memory, wherein the error memory has recorded that a display unit of the means of transport 1b automatically turns off. In a second step 200, an error report F1-F6 stored on the back-end server 3 is automatically determined depending on the error report ER. For example, the error pattern F1-F6, concerning the situation where the display unit automatically turns off, is stored on the back-end server 3. However, in order be able to identify a unique troubleshooting operation M1-M6, the back-end server 3 requires further configuration data of the means of transport 1b. Therefore, in a third step 300, a configuration requirement K1-K5 is automatically determined depending on the stored error pattern F1-F6. For example, there may be several configuration requirements K1-K5 for two error patterns F1 and F2. For example, a configuration requirement K1 may be assigned to the error pattern F1, wherein a serial number of the display unit of the means of transport 1b is required for further analysis. The second error pattern F2 may be associated with a configuration requirement K2, which states that a current software version by which the display unit of the means of transport 1b is operated needs to be requested. Accordingly, in a fourth step 400, a configuration request representing the union set of configuration requirements K1, K2, which states that a serial number of the display unit is needed and that a software version of the display unit is needed, is automatically generated and sent to the means of transport 1b. The means of transport 1b then generates a configuration specification A comprising a serial number of the display unit and a software version of the display unit. In response thereto, in a fifth step 500, the configuration specification A is sent to and received from the back-end server 3 as a response. On the back-end server 3, in a sixth step 600, an automatic determination of a troubleshooting operation M1-M6 based on the configuration specification A is performed. Here, it is determined that the serial number sent by the means of transport 1*b* is not assigned to the troubleshooting operation M1 provided for the first error pattern EP1. Thus, this EP1 error pattern may be excluded. However, the software version associated with the error pattern EP2 corresponds to a specific troubleshooting operation M2, which provides for a software update of the software that operates the display unit. Accordingly, in a seventh step 700, a sending of the troubleshooting operation M2 to the means of transport 1*b* is performed. Here a software update is carried out on the means of transport 1*b*, which solves the error.

Figure 3:
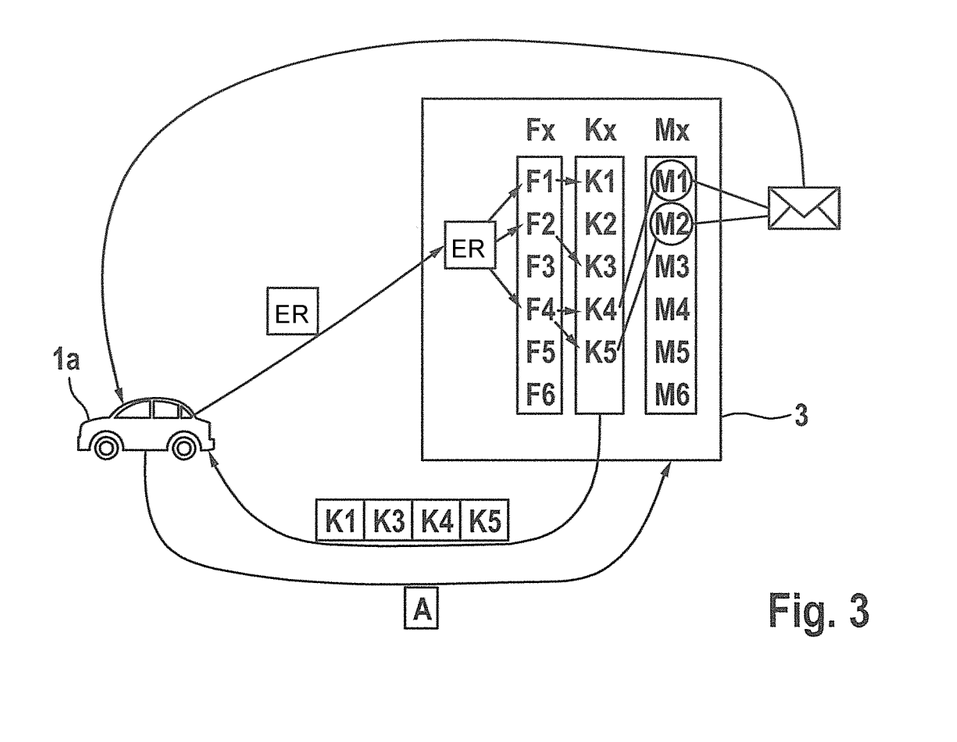
FIG. 3 shows an illustration of an interaction between the means of transport according to the invention and the back-end server according to the invention.

FIG. 3 illustrates the steps of the method according to the invention in a generalized form. FIG. 3 shows a means of transport 1*a* and a back-end server 3. The back-end server 3 includes an error pattern group Fx, a configuration requirement group Kx, and a troubleshooting operation group Mx. Each of these groups accordingly includes error patterns F1-F6, configuration requirements K1-K5 as well as troubleshooting operations M1-M6. In this regard, the means of transport 1*a* first sends an error report ER to the back-end server 3. For the error report ER, three error patterns F1, F2 and F4 are determined, which are eligible for the error report ER. These error patterns F1, F2, F4 are in turn assigned to the configuration requirements K1, K3, K4 and K5 respectively. These configuration requirements K1, K3, K4, and K5 are needed to find a troubleshooting operation M1-M6 from the troubleshooting operation group Mx for the corresponding error patterns F1, F2, and F4. The configuration requirements K1, K3, K4 and K5 are sent to the means of transport as illustrated above the corresponding arrow. In response thereto, the means of transport determines the requested configuration specification A. In response thereto, the means of transport sends a configuration specification A to the back-end server 3. Due to the configuration specification, error patterns F1 and F2 may be excluded as error patterns. Thus, for the error pattern F4 relating to the configuration requirements K4 and K5, the troubleshooting operations M1 and M2 are sent to the means of transport 1*a*, as illustrated by the envelope and the corresponding arrow pointing to the means of transport 1*a*.

LIST OF REFERENCE NUMERALS

1*a*-1*d* Means of transport
2 Service institution
3 Back-end server
4 Anonymization
5 Request
6 Response
10 System
100-700 Method acts
A Configuration specification
F1-F6 Error pattern
Fx Error pattern group
K1-K6 Configuration requirement
Kx Configuration requirement group
M1-M6 Troubleshooting operation
Mx Troubleshooting operation group

The invention claimed is:

1. A method for remotely handling an error report of a means of transport comprising:
receiving the error report from the means of transport on a back-end server;
automatically determining, by the back-end server, an error pattern stored on the back-end server as a function of the error report;
automatically determining, by the back-end server, a configuration requirement as a function of the determined error pattern, wherein the configuration requirement is information regarding components of the means of transport associated with the determined error pattern;
automatically generating and sending, by the back-end server, a configuration request representing a union set of the respective configuration requirements to the means of transport;
receiving, by the back-end server, a configuration specification including configuration data of the means of transport with regard to the union set of the respective configuration requirements from the means of transport in response to the configuration request; and
automatically determining a troubleshooting operation based on the configuration specification by the back-end server.

2. The method according to claim 1 further comprising the step of sending the troubleshooting operation to the means of transport.

3. The method according to claim 1, wherein the troubleshooting operation comprises automatically causing a software update and/or automatically detecting a mock error.

4. The method according to claim 1, wherein the error report is created on the basis of on-board diagnostic data and/or entries of an error memory and/or is determined by means of a sensor system of a means of transport.

5. The method according to claim 1, wherein the configuration specification is
a type of a means of transport component and/or
a position of the means of transport component and/or
an operating state of the means of transport component and/or
a year of manufacture of the means of transport component, and/or
a serial number of the means of transport component.

6. The method according to claim 1, wherein the error pattern concerns
a malfunction of a part of the means of transport, and/or
a non-functioning of the part of the means of transport, and/or
a temperature anomaly of the part of the means of transport and/or
a software error in the means of transport.

7. The method according to claim 1 further comprising the steps of:
displaying a selection of predefined error reports on a display unit, in response thereto
receiving a user input for the selection of the predefined error reports, in response thereto
creating the error report depending on the selected predefined error report.

8. The method according to claim 1, wherein a plurality of error patterns having respective configuration requirements comprise a plurality of troubleshooting operations.

9. A means of transport configured to:
determine an error report,
send a message concerning the error report to a back-end server,
receive a configuration request in response to the error report message, wherein the configuration request represents a union set of respective configuration requirements, wherein the configuration requirement is information regarding components of the means of transport associated with an error pattern determined based on the error report, create a configuration specification including configuration data of the means of transport with regard to the union set of the respective configuration requirements in response to the configuration request and send it to the back-end server in response to the configuration request, and receive a troubleshooting operation in response to the configuration specification.

10. A back-end server, configured to:

automatically receive an error report from a means of transport, automatically search for error patterns that match the error report and, depending on this, determine a respective configuration requirement, wherein the configuration requirement is information regarding components of the means of transport associated with the determined error pattern, automatically generating a configuration request representing a union set of the respective configuration requirements and sending it to the means of transport, receive a configuration specification including configuration data of the means of transport with regard to the union set of the respective configuration requirements in response to the configuration request, and automatically determine a troubleshooting operation based on the configuration specification.

11. A system comprising a means of transport according to claim 9 and a back-end server configured to:

automatically receive the error report from the means of transport, automatically search for error patterns that match the error report and, depending on this, determine a respective configuration requirement, automatically generate the configuration request representing a union set of the respective configuration requirements and send it to the means of transport, receive the configuration specification in response to the configuration request, and automatically determine the troubleshooting operation based on the configuration specification.

* * * * *

UNITED STATES PATENT AND TRADEMARK OFFICE
CERTIFICATE OF CORRECTION

| | | |
|---|---|---|
| PATENT NO. | : 12,001,272 B2 | Page 1 of 1 |
| APPLICATION NO. | : 17/415753 | |
| DATED | : June 4, 2024 | |
| INVENTOR(S) | : Axel Knaut et al. | |

It is certified that error appears in the above-identified patent and that said Letters Patent is hereby corrected as shown below:

On the Title Page

The title in item (54) and in the Specification, Column 1, Lines 1-5, shown as "METHOD FOR THE REMOTE-CONTROLLED HANDLING OF AN ERROR FINDING IN A MEANS OF TRANSPORT, MEANS OF TRANSPORT, BACKEND SERVER AND SYSTEM" should read --METHOD FOR REMOTELY HANDLING AN ERROR REPORT OF A MEANS OF TRANSPORT, MEANS OF TRANSPORT, BACK-END SERVER AND SYSTEM--

Signed and Sealed this
Thirteenth Day of August, 2024

Katherine Kelly Vidal
*Director of the United States Patent and Trademark Office*